Figure 1:
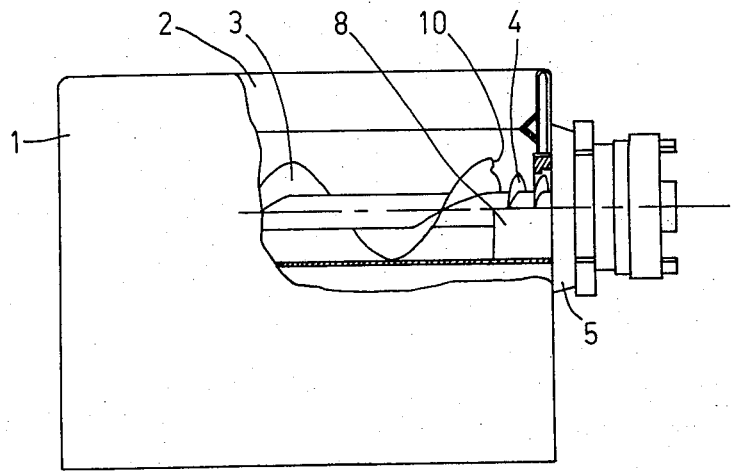

United States Patent [19]
Jensen

[11] 3,823,882
[45] July 16, 1974

[54] MEAT MINCING MACHINE

[76] Inventor: William Jensen, Tjorneallee 10, 4200 Slagelse, Denmark

[22] Filed: Apr. 27, 1971

[21] Appl. No.: 137,908

[30] Foreign Application Priority Data
Apr. 27, 1970 Denmark............................ 2115/70

[52] U.S. Cl. .............................. 241/152 R, 241/247
[51] Int. Cl. ............................................ B02c 18/30
[58] Field of Search ........... 146/182, 186, 187, 184, 146/185, 188, 190, 191; 241/152 R, 163, 247

[56] References Cited
UNITED STATES PATENTS
1,324,490  12/1919  Bauer et al. ......................... 146/188
2,796,901  6/1957  Autio .................................. 146/184

FOREIGN PATENTS OR APPLICATIONS
363,740  8/1906  France............................... 241/247

Primary Examiner—Gil Weidenfeld
Attorney, Agent, or Firm—Albert C. Nolte, Jr.; Edward B. Hunter; C. Bruce Hamburg

[57] ABSTRACT

Apparatus for grinding food particularly frozen meat, which comprises two worm conveyors, the second and smaller one of which receives meat conveyed by the first conveyor and passes it to grinding means. To prevent the delivery of an excess amount of food to the second conveyor which would cause stalling of the device, the delivery point of the second conveyor to the first is within a hopper for feeding the meat to the conveyors and there are provided means for diverting the excess of food back into the hopper at the point of delivery.

4 Claims, 5 Drawing Figures

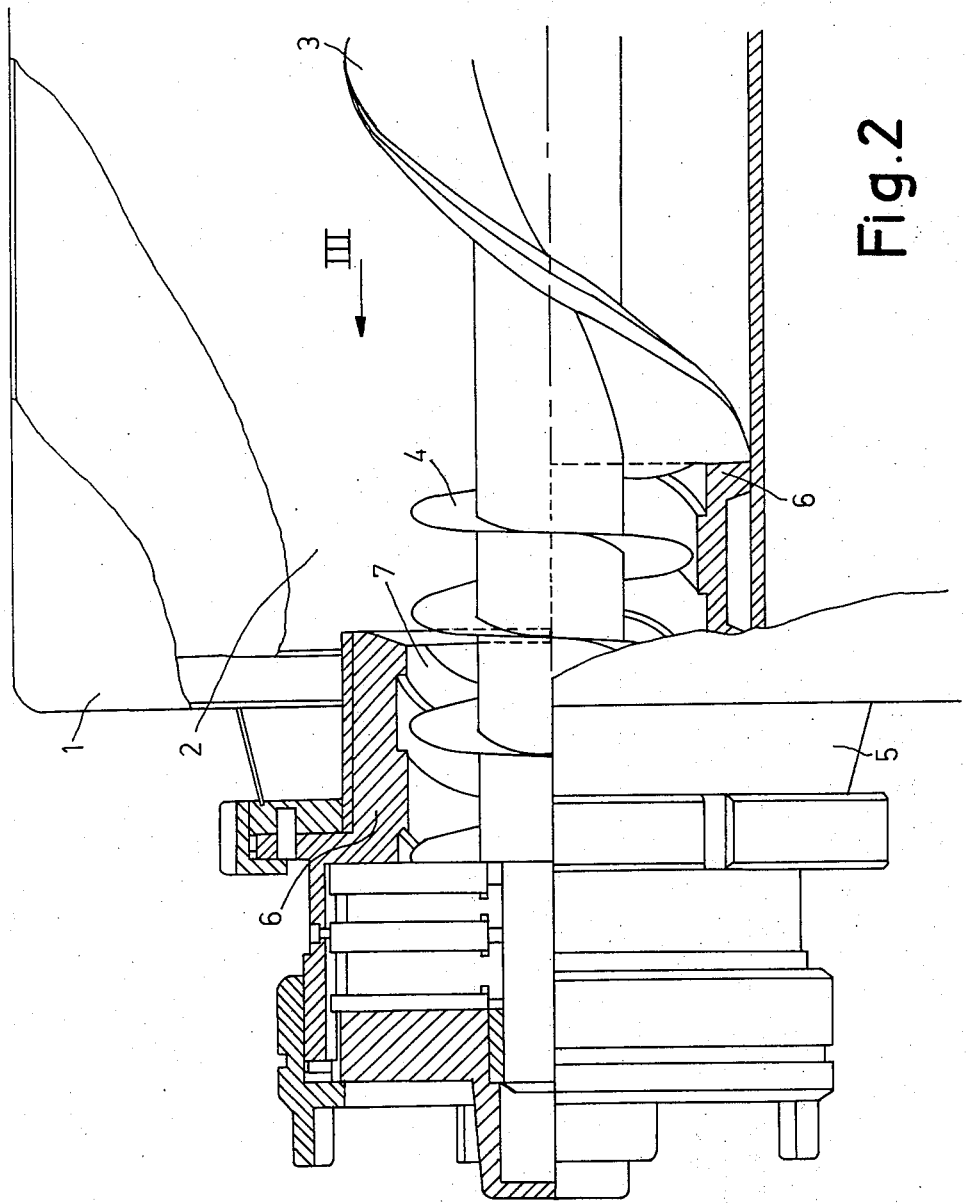

MEAT MINCING MACHINE

The invention relates to a mincing machine, particularly a meat mincing machine for frozen blocks of meat, and being of the type having a feeder funnel, at the bottom of the funnel a rotating worm conveyor that is divided into two parts having different diameters, and which conveys the material to be minced to a cutting tool.

Mincing machines of the type indicated are known wherein the two parts of the worm conveyor are arranged either end to end and with the screw pitch in the same direction, or within each other and with the screw pitch in opposite directions. In the latter case, the worm conveyor part with large diameter first conveys the material to be minced towards one end of the machine where it is gripped by the worm conveyor part with small diameter and is conveyed by same towards the machine's other end through a tube arranged in the worm conveyor part with large diameter and concentric with same. The small diameter worm conveyor part that cooperates directly with the cutting tool has a diameter adapted in accordance with said tool. A worm conveyor with such a diameter can only with difficulty grip relatively large, frozen blocks of meat, particularly when the latter have been frozen in plastic bags and are more or less spherical. In mincing machines of this type, this difficulty has been circumvented by arranging the large diameter worm conveyor part under the feeder funnel, said large diameter being adapted to the size of the meat chunks so that the worm conveyor is able to grip them and convey them to the samll diameter part. The previously known machines of the type indicated were, however, subject to frequent cases of the meat freezing fast in the small diameter conveyor part even when a strong drive motor is employed.

The object of the invention is to devise a mincing machine of the type indicated wherein there is no risk that the meat does freeze fast in the small worm conveyor even if a drive motor which is not particularly strong, is used, and this is obtained according to the invention by the fact that the large diameter worm conveyor part extends from one side of the funnel to a point at a distance from the opposite side of the funnel. It is hereby avoided that the small diameter worm conveyor is compelled to convey the entire amount of material to be minced that at any time is conveyed by the large diameter part. According to the invention, freeze blockages can be avoided when it is provided for that the pressure between the frozen meat and the abutting surfaces in the small conveyor is not larger than a pre-determined value. The large diameter conveyor part in the machines of the type indicated will normally have a considerably larger transport volume than the small diameter part. In the previously known machines of the type indicated the transition from the large diameter part to the small diameter part takes place in a closed space. If, at any time the conveying volume around the large diameter worm conveyor part is completely filled with material to be minced, this conveyor part will convey more material than the small diameter part is able to receive, and an intensive compression of the material will take place, and said material will be pressed with great force against the surrounding surfaces in the small conveyor, and it will freeze fast on said surfaces. In the machine according to the invention there is, however, provided an open space at the transition from the large diameter worm conveyor part to the small diameter worm conveyor part, and if, at any time, the first part conveys more material than the latter part is able to convey further on, the excess material is able to escape through this space. It has turned out that the freeze blockages that frequently occured in the previously known machines of the type indicated are avoided hereby, and that a satisfactory function can be achieved even when using a drive motor that is not particularly strong.

The mincing machine may, at the end of the large diameter worm conveyor part, have a non-rotative free-cutting member. Hereby it is obtained that the material to be minced conveyed by the large diameter conveyor part is cut into smaller pieces that can be gripped by the small diameter conveyor part and conveyed by same without any wedging.

The free-cutting member may consist of the end of an under bearing member for that end of the small diameter worm conveyor part that projects into the funnel. Such a member may be made without rendering the machine noticeably more expensive, and it can easily be removed for sharpening.

The under bearing member may be arranged turnably adjustable. Hereby it becomes possible to alter the size of the aperture in the open space at the transition to the small diameter conveyor part and thereby adjust the conveying pressure according to the actual material to be minced.

The small diameter conveyor part may have an increasing pitch in the direction towards the cutting tool. Hereby the conveying volume increases in the conveying direction, and a particularly good guarantee against freeze blockage is obtained.

The small diameter conveyor part may have a constant diameter, and the surrounding housing portion may have a screw-thread-like inner surface where the top has a constant diameter while the bottom has diameter increasing in the direction towards the cutting tool. Hereby a further quarantee against freeze blockages is obtained.

The tops of the screw thread may be shaped like broad bands, and the width of the latter may be diminishing in the direction towards the cutting tool. The guarantee against freeze blockages can also be increased hereby.

The invention will be described more in detail below with reference to the accompanying drawings, wherein FIG. 1 shows a lateral view of an embodiment of a mincing machine according to the invention, seen partly in section, FIG. 2 a larger scale view of a detail of the machine shown in FIG. 1, the view showing the transition from a worm conveyor part with large diameter to a worm conveyor part with small diameter, seen partly in section along line II—II in FIG. 3, FIG. 3 a lining in the detail shown in FIG. 2, looking in the direction of arrow III in FIG. 2, FIG. 4 a detail corresponding to the one in FIG. 2, shown in another embodiment of the machine according to the invention, and FIG. 5 the lining shown in FIG. 4, seen along the line V—V in FIG. 4.

In FIG. 1 is shown a meat mincing machine with a housing 1, the upper part of the latter constituting a feeder funnel 2 at the bottom of which there is arranged a worm conveyor part 3 with large diameter. Between the worm conveyor part 3 and a cutting housing 5 with cutting members there is arranged a worm conveyor part 4 with a smaller diameter. When pieces of meat are placed in the feeder funnel 2 they are gripped by the large conveyor part 3 and are conveyed by same towards the small conveyor part 4 that conveys them further on through the cutting members arranged in the cutting housing 5.

Figure 3:
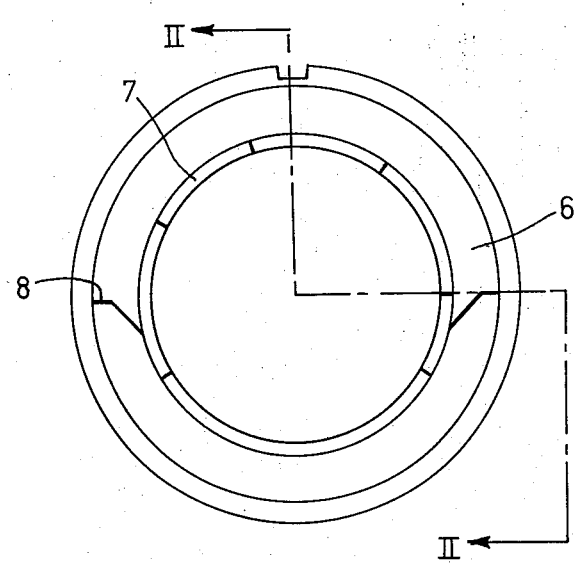

As shown in FIGS. 2 and 3 the small diameter conveyor part 4 is surrounded by a lining 6 that at the part of the conveyor in the region of the cutting housing 5 surrounds the entire periphery of said conveyor, while at the part of the conveyor 4 adjacent the conveyor part 3 said lining only surrounds the lower half of said conveyor 4.

Thereby there is formed an open space above the conveyor part 4 between the wall in the housing 1 and the large diameter conveyor part 3. The large conveyor conveys pieces of meat to this space from the feeder funnel 2, and a cutting edge 10 on the end of the large diameter conveyor that cooperates with a cutting edge 8 on the lining 6 causes such a cutting of the meat pieces that the small conveyor easily can grip them. As the space from which the small conveyor is supplied is open, no excess pressure can appear therein. If the large conveyor conveys more meat than the small one can remove, the excess meat will escape upwards from the space. The small conveyor 4 is arranged with increasing pitch in the conveying direction, and the inner surface of the lining 6 that surrounds the worm conveyor is conical having a diameter that increases in the conveying direction. During the conveying of the meat pieces there will therefore, at the small worm conveyor, be formed an increasing play which will prevent the appearance of pressure components between the meat pieces and these surfaces, and thereby freeze blockages will be counteracted. On the inner surface of the lining 6 there are welded helical strips 7 that cause a turning of the pieces of meat during the conveying so that there arises a noticeable component of motion between the meat pieces and the lining, which factor also counteracts freeze blockage. The strips 7 have a width that diminishes in the conveying direction, and it will be understood that therefore there will also appear play between the meat pieces and the strips when the meat pieces are conveyed forwards.

Figure 4:
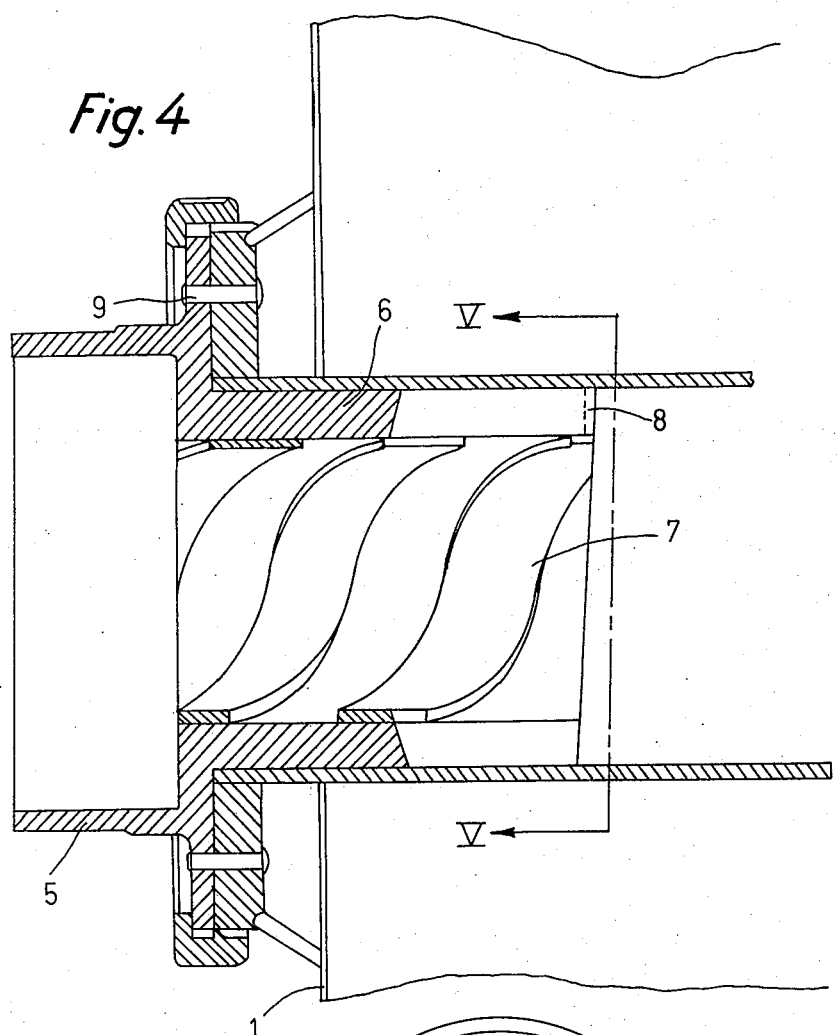
Figure 5:
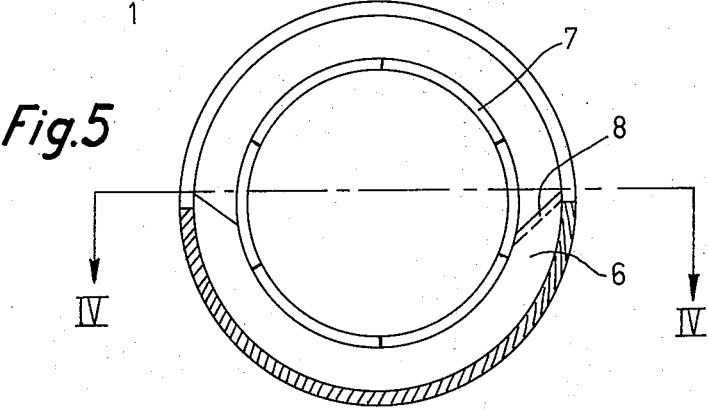

The machine shown in FIGS. 4 and 5 have a lining with a flange with holes in which four pins 9 fastened to the housing 1 fit. The flange has eight holes, and it is therefore possible to mount the lining in different positions in relation to the housing 1 and thereby shift the aperture of the open space at the transition between the large and the small worm conveyor and to adjust it to the actual material to be minced i.e., the size of the aperture communicating between the sleeve and the hopper is varied by cooperation between the sleeve and adjacent parts of the hopper in the manner of a damper and as shown in the drawings with adjacent regions of the hopper close to the delivery point of the large conveyor cooperating with the lining to limit the amount of food which can pass from the lining or sleeve to the hopper.

It will be understood that the present invention may be employed in connection with mincing machines of rather different types. The large worm conveyor may be arranged vertically as well as horizontally in supply hoppers of very different types. The small worm conveyor may be coaxial with the large worm conveyor either end to end with same or inside it. However, it may also be arranged beside the large conveyor, parallel with same or at a larger or smaller angle in relation to same. The essential idea of the invention is that there is an open space at the transition between the large and small worm conveyor, said space preventing the formation of excess pressure in the supply to the small conveyor. Even though the invention particularly relates to mincing machines for frozen blocks of meat and has the object of preventing freeze blockages in same, it will be understood that the invention also advantageously may be used in other mincing machines of the type indicated when it is of importance to be able to regulate the pressure with which the material to be minced in conveyed by the small worm conveyor.

I claim:

1. Apparatus for grinding food comprising a hopper, a barrel communicating with the hopper and leading to a grinding element, said barrel having grinding knives therein, a first worm conveyor in the hopper for conveying food in the hopper towards the barrel, a second worm conveyor of lesser diameter than said first conveyor, the second conveyor extending into the barrel from the hopper, said first worm conveyor being disposed to deliver food to said second worm conveyor, the delivery point of said first conveyor to said second conveyor being within the hopper and means at that delivery point for diverting an excess of food delivered by the first conveyor over that which can be conveyed by the second conveyor from the delivery point to the hopper whereby said hopper is constituted as means for receiving such excess, said means for diverting excess food comprising a sleeve disposed in said barrel and extending to said delivery point and having an inner diameter less than the diameter of said first conveyor, said sleeve at said delivery point extending around only a part of the diameter of the second conveyor and defining an opening from the interior thereof to said hopper for the passage of excess food to the hopper.

2. Apparatus as claimed in claim 1 wherein said sleeve is circumferentially adjustable and an adjacent portion of said hopper obturates said opening of the sleeve communicating with said hopper.

3. Apparatus as claimed in claim 1 wherein said second worm conveyor is integral with said first conveyor and is coaxial and in end to end relationship with said first worm conveyor.

4. Apparatus as claimed in claim 3 in which said sleeve extends completely through said barrel and is circumferentially adjustable and a portion of said hopper adjacent said delivery point of the first conveyor obturates said opening from the sleeve to the hopper as the sleeve is circumferentially adjusted.

* * * * *